United States Patent [19]

Bielanski et al.

[11] Patent Number: 4,812,322
[45] Date of Patent: Mar. 14, 1989

[54] CHUCK FOR FOOD ENCASING MACHINE AND METHOD FOR STUFFING A CASING WITH FOOD EMULSION

[75] Inventors: James F. Bielanski, Oak Forest; Keith A. Watts, Elmhurst, both of Ill.

[73] Assignee: Viskase Corporation, Chicago, Ill.

[21] Appl. No.: 180,914

[22] Filed: Apr. 13, 1988

[51] Int. Cl.⁴ .............................. A22C 7/00
[52] U.S. Cl. .................. 426/513; 17/49; 17/41
[58] Field of Search ............ 17/49, 33, 35, 41; 426/513

[56] References Cited

U.S. PATENT DOCUMENTS

3,115,668 12/1963 Townsend .
4,570,300 2/1986 Nausedas .
4,670,942 6/1987 Townsend .
4,787,122 11/1988 Vinokur ..................... 17/35

Primary Examiner—Willie G. Abercrombie
Attorney, Agent, or Firm—John C. LeFever

[57] ABSTRACT

A chuck for a stuffing machine for gripping and rotating a food-filled casing about a longitudinal axis to facilitate formation of links. The chuck has a plurality of antifriction free-wheeling rollers disposed along a longitudinal bore. Torgue for rotating the stuffed casing passing through the bore is transmitted by the engagement of a side edge of each roller against the casing. The casing, moving passed the rollers, causing the rollers to turn on their own axes so that torque transmission for rotating the casing about its longitudinal axis is accomplished with minimal longitudinal drag on the casing.

21 Claims, 2 Drawing Sheets

CHUCK FOR FOOD ENCASING MACHINE AND METHOD FOR STUFFING A CASING WITH FOOD EMULSION

TECHNICAL FIELD

The present invention relates to a rotatable chuck for gripping and rotating the casing during stuffing to facilitate the formation of links. More particularly, the invention relates to a rotatable chuck having antifriction means which reduces the drag on the casing caused by the gripping of the chuck about the casing to rotate it.

BACKGROUND OF THE INVENTION

Stuffing machines of the type shown in U.S. Pat. No. 3,191,222 are commonly used in the manufacture of frankfurters and the like. In use, a hollow tubular shirred casing stick is located on the stuffing horn and is deshirred and stuffed with a food emulsion discharged from the horn. positioned at the discharge end of the stuffing horn is a rotatable chuck member made of plastic. As the casing deshirrs and fills with the food emulsion, it passes longitudinally through a cylindrical bore in the chuck. The chuck forces the filled casing into a smaller diameter during longitudinal movement through the chuck. The chuck is rotatably driven so it transfers a torque to the casing for twisting the stuffed casing into links. Twisting into links is accomplished in association with the pinchers of a conventional linking apparatus located downstream from the stuffing horn and chuck.

The chuck member also is designed to impose a longitudinal drag or "holdback" on the casing moving longitudinally through its bore. Without this holdback the food emulsion will not tightly stuff into the casing. The holdback on the casing is provided by longitudinal flutes spaced circumferentially around the bore of the conventional chuck member. These flutes. as shown in U.S. Pat. Nos. 3,115,668 and 3,191,222 extend substantially the full length of the chuck bore and provide the longitudinal dragging action to casing within the bore.

The inlet end of the chuck bore is inwardly tapered from a first relatively larger diameter to a second relatively smaller diameter at a location intermediate the inlet end and the discharge end of the bore. This tapered inlet receives the front end of the shirred casing stick and the flutes in this section grip and rotate the stick while casing deshirrs and is drawn from the front end of the stick during stuffing. The stuffed casing then passes through the smaller diameter downstream of the intermediate location where it is deformed and gripped by the flutes pressing inwardly against the stuffed casing. The flutes, by gripping the stuffed casing, allow the chuck to transmit torque to the stuffed casing thereby rotating the stuffed casing for twisting it into links.

The flutes must be properly sized to provide sufficient holdback for stuffing yet must not apply so much holdback that the casing will be filled with an excessive amount of emulsion and burst. As previously indicated, the flutes also must grip the casing to provide the needed torque transmission for twisting and linking the filled casing.

It has always been a compromise to design a chuck with flutes which provide sufficient gripping for adequate torque transmission without gripping so tightly that there is excessive holdback as this could result in overstuffing and possible breakage of the casing. The conventional practice has been to design a chuck which provides only adequate holdback rather than risk overstuffing. Accordingly, since the flutes are subject to wear, the practice has been to replace the chucks as soon as the flute wear is such that the casing is not stuffed to size or abnormal twists and links are formed. Typically, the chucks are considered expendable by the meat packing houses, and are replaced every day or so. This represents a considerable maintenance cost.

One proposed solution to the chuck wear problem is described in U.S. Pat. No. 4,670,942. The chuck described in this Pat. has a set of free-wheeling rollers journaled to the chuck body adjacent the outlet end of the bore. These rollers which surround the outlet are arranged to grip and rotate the stutted casing as it leaves the bore without correspondingly increasing the longitudinal drag on the casing.

Another problem with the conventional chucks is that they are unsuitable for use with casings having outer coatings with substantially higher coefficient of friction values than the typical uncoated nonreinforced cellulosic casing conventionally used to stuff frankfurters. One such coating is wood-derived tar-depleted liquid smoke impregnated in the cellulosic casing outer wall. as for example described in U.S. Pat. No. 4,505,939. The surface of a liquid smoke impregnated cellulosic casing of this type has a dynamic coefficient of friction (COF) of at least 0.46, whereas, the surface of typical uncoated cellulosic casing has a dynamic COF on the order of 0.33.

When the liquid smoke impregnated nonreinforced cellulosic casings are stuffed on a conventional frankfurter stuffing machine using a rotatable plastic chuck having end-to-end flutes as described in U.S. Pat. No. 3,191,222, the higher COF creates a greater longitudinal drag or holdback so that the resulting frankfurter links are shorter and larger in diameter than the length of frankfurters made when using the lower COF uncoated nonreinforced cellulosic casings. Shorter frankfurter links are commercially unacceptable.

OBJECTS OF THE INVENTION

One object of this invention is to provide a food stuffing machine chuck member which is less subject to wear and has a longer operating life than commercially available chucks.

Another object is to provide a chuck member which is suitable for cellulosic food casings having either uncoated or coated outer surfaces.

A further object is to provide a chuck which is able to impart sufficient torque to rotate and link the stuffed casing while decreasinq the longitudinal drag or holdback exerted on the casing.

Still another object of this invention is to provide a method for consecutively deshirring and stuffing a food casing with food emulsion by suitable casing engagement and rotational deformation to provide links of substantially constant length regardless of whether the outer surface of the cellulosic casing has either a relatively high coefficient of friction or a lower coefficient of friction.

These and other objects will be apparent to those skilled in the art from the following description.

SUMMARY OF THE INVENTION

One aspect of this invention relates to a chuck member for engaging and deforming food-filled casing comprising a rotatable body having a central cylindrical bore to accommodate the passage of stuffed casing through the chuck. The bore defines a central longitudinal axis about which the chuck rotates and has an inlet and an outlet. The inlet is inwardly tapered from a first relatively larger diameter to a second relatively smaller diameter at a location intermediate the inlet and outlet. The intermediate location is up to about 30% of the longitudinal distance from the inlet to the outlet. With this arrangement the tapered inlet of the bore up to the intermediate location defines a casing engaging section upstream of the intermediate location and the portion of the bore downstream of the intermediate location defines a casing deforming section.

The particular improvement of this chuck member comprises the combination of a multiplicity of longitudinally extending flutes in the casing engaging section with a plurality of spaced rollers in the casing deforming section. The flutes are spaced circumferentially around the periphery of the inlet and terminate at the intermediate location. Each of the flutes has first and second sidewalls which extend inwardly from the periphery of the inlet toward the central axis. The first sidewall is perpendicular to the inlet periphery and the second sidewall is inclined toward and intersects the first sidewall. The intersection forms a flute apex and defines a casing engaging edge of the flute. First sidewalls of adjacent flutes all face in the direction of rotation of the chuck.

In the chuck member of this invention, a plurality of spaced rollers are journaled to the body of the chuck along the casing deforming section between the aforementioned intermediate location and the bore outlet. The axis of rotation of each roller lies in a plane substantially perpendicular to the central axis of the bore. A portion of each roller extends radially into the casing deforming section of the bore to engageably deform a food-filled casing passing through the bore.

The rollers are aligned in at least three longitudinal rows spaced circumferentially about the perimeter of the casing deforming section of the bore. There are at least two longitudinally spaced rollers in each row. preferably, the rollers in one row are aligned with rollers in an adjacent row so that their axes of rotation lie in the same transverse planes.

Each roller has an end face which leads in the direction of chuck rotation and an end face which trails in the direction of chuck rotation. The intersection of the roller outer peripheral surface with the leading end face defines a leading edge which deforms and bites into the food-filled casing to transmit the torque or rotation of the chuck to the food-filled casing.

The deformation and biting for torque transmission may be accomplished by providing a roller which is relatively thin. e.g., disc-shaped wherein the entire peripheral surface of the disc-shaped roller bites into the food-filled casing. As an alternative, the roller can be thicker and have the shape of a truncated right circular cone wherein the cone face leading in the direction of chuck rotation is larger in diameter than the cone face trailing in the direction of chuck rotation. In this case, the biting edge of the roller is formed at the intersection of the conical surface with the leading cone face. In either roller configuration. it should be appreciated that the diameter of the trailing face of each roller does not exceed the diameter of the leading face of the roller.

Another aspect of this invention relates to a method for consecutively deshirring, stuffing, and rotating a shirred food casing with food emulsion including the steps of moving the deshirring and filling casing longitudinally into a progressively smaller diameter casing engaging zone and then moving the filled and diametrically restricted casing through a casing deforming zone where the filled casing is gripped and rotated about its longitudinal axis.

The specific improvement of this method comprises gripping and driving the stuffed casing about its longitudinal axis by pressing rotatably against and inwardly deforming the filled casing in said casing deforming zone at a plurality of circumferentially and spaced locations around the axis of the filled casing and in each of a multiplicity of longitudinally spaced sub-zones in the casing deforming zone.

It will hereinafter be demonstrated that this invention achieves all of the aforedescribed objects, i.e., providing a chuck member for use in stuffinq a casinq having a relatively high dynamic COF (e.g., a wood-derived liquid smoke impreqnated casing) to produce uniform frankfurter links comparable in diameter and length to links produced when stuffing a casing having a more conventional lower dynamic COF.

DESCRIPTION OF THE PREFERRED EMBODIMENT

Figure 1:
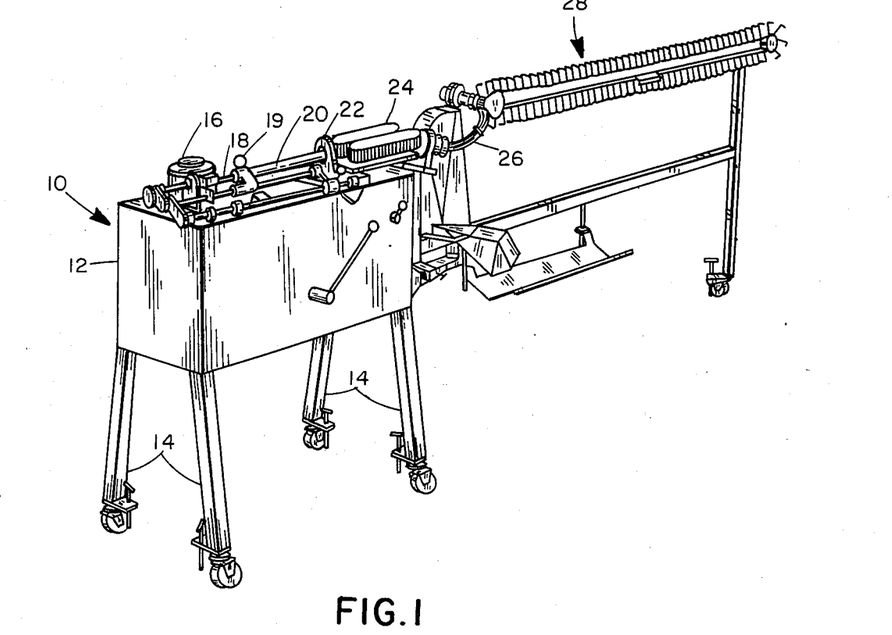
FIG. 1 is a perspective view of a stuffing machine embodying the chuck member of the invention and capable of practicing the inventive method.

FIG. 1 illustrates the essential components of a conventional food stuffing machine of the type generally described in the aforementioned U.S. Pat. No. 3,191,222. The stuffing machine, generally indicated at 10, includes a frame 12 supported on four legs 14. A food emulsion pump 16 mounted on frame 12 communicates with a retractable stuffing horn 18. A food emulsion, (e.g., a meat emulsion) is pumped from a reservoir (not shown) through pump 16 and into stuffing horn 18. A follower 19 is slideably mounted on stuffing horn 18 to move a hollow shirred stick 20 of food casing forward and towards the discharge end 21 (FIG. 2) of stuffing horn 18.

Figure 2:
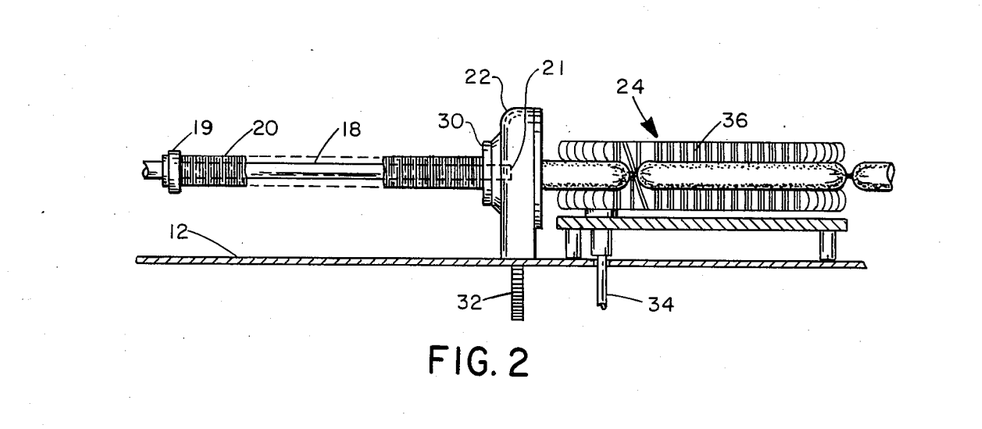
FIG. 2 is an enlarged elevation view of a portion of the FIG. 1 machine illustrating the stuffing tube, the chuck housing, and the linking mechanism.

As shown in FIGS. 1 and 2, a chuck housing 22 is mounted on the frame about the discharge end 21 of the stuffing horn. Also mounted on frame 12 downstream from the chuck housing is a linking mechanism 24. A looper 26 (FIG. 1) on frame 12 receives linked food-stuffed casings from linking mechanism 24 and swings in a conventional fashion to loop the links onto a J-hook conveyor 28.

Chuck housing 22 (FIG. 2) includes a rotatably driven member 30 which is rotatably connected to a drive gear 32, which, in turn, is connected to a source of rotational power (not shown). Similarly, a drive shaft 34 is connected to linking mechanism 24 to cause rotation of linking chains 36 serving to link the food-stuffed casing in a conventional manner.

Figure 3:
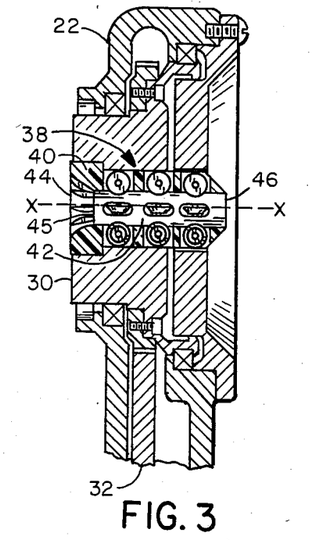
FIG. 3 is a further enlarged longitudinal view taken in a cross-section of the chuck housing and chuck member.

FIG. 3 illustrates the chuck of the present invention generally indicated at 38 connected to the rotatably driven member 30. Chuck 38 comprises a generally cylindrical plastic body 40 having a central hollow cylindrical bore 42. The bore defines a central longitudinal axis X—X about which the chuck 38 rotates and has an inlet 44 and an outlet or discharge end 46.

Figure 4:
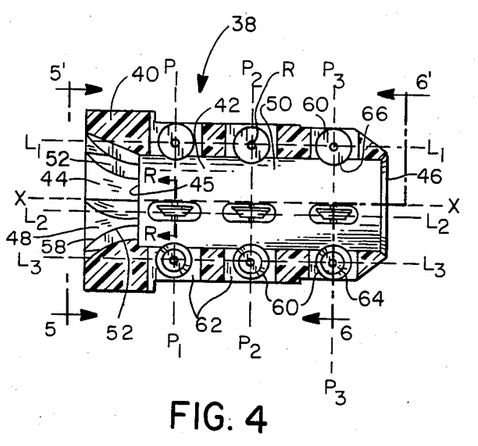
FIG. 4 is a still further enlarged longitudinal view taken in cross-section of the chuck member.

As best seen in FIG. 4, the bore inlet 44 is inwardly tapered from a first relatively larger diameter to a second relatively smaller diameter at a location indicated at 45 intermediate inlet 44 and discharge end 46. Intermediate location 45 is up to about 30% of the longitudinal distance from inlet end 44 to discharqe end 46, so as to form a tapered casing engaging inlet section 48 upstream of intermediate location 45 and a filled casing deforming section 50 downstream of the intermediate location 45.

Figure 5:
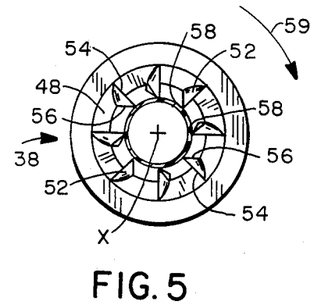
FIG. 5 is a view of the FIG. 4 chuck member inlet end taken along the line 5—5.

As best seen in FIGS. 4 and 5, the casing engaging inlet section 48 includes a multiplicity of longitudinally extending flutes 52. These flutes are spaced circumferentially around the periphery of the tapered inlet section 48 and extend the entire length of the inlet section 48 from the inlet 44 to the intermediate location 45. Each flute has a first sidewall 54 and a second sidewall 56 extending inwardly from the periphery of the inlet section toward central axis X—X. As illustrated in FIG. 5, each first sidewall 54 is normal to the periphery of the inlet section 48 and faces in the direction of rotation of the chuck 38 about its longitudinal axis X—X as indicated by arrow 59. Each second sidewall 56 faces away from the direction of rotation and is inclined toward the first sidewall and intersects it at flute apex 58. This apex defines a casing engaging edge of each flute.

With this arrangement, the tapered casing engaging inlet section 48 receives the front end of a casing stick inserted into the inlet section and holds the casing stick 20 on the stuffing horn as casing deshirrs and is pulled forward through the chuck bore 42. The flutes maintain the casing stick centered with respect to the chuck axis X—X and the apex 58 of each flute grips the stick for transmitting torque to the stick. In this fashion, the rotation of the chuck about axis X—X is transmitted to the stick for rotatably driving the stick about the stuffing horn 18.

Although FIG. 5 shows eight flutes 52 equally spaced circumferentially around the periphery of the tapered inlet end 48 and this number of flutes is preferred. fewer or more flutes may be provided as needed to engage and rotate the casing stick.

The number and size of the flutes 52 are selected so that the front end of a casting stick can extend into the tapered inlet 48 a distance of about 50% to about 90% of the length of the inlet. This allows for maximum engagement with the end of the shirred casing stick for adequate torque transmission and yet allows easy deshirring of the casing from the stick.

Figure 6:
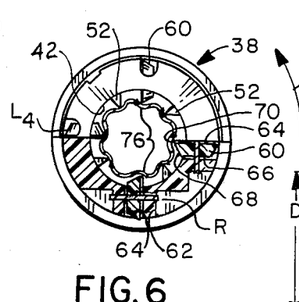
FIG. 6 is a view of the FIG. 4 chuck member discharge or outlet end taken along line 6—6.
Figure 8:
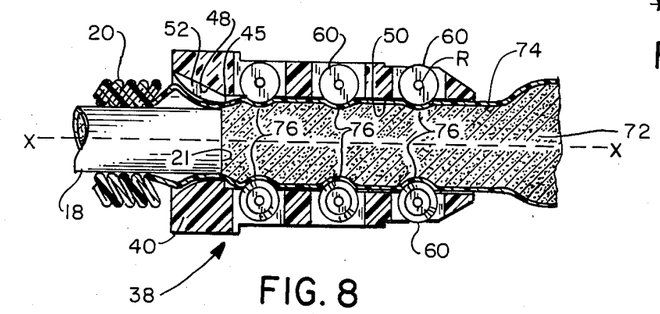
FIG. 8 is a view of the chuck member as shown in FIG. 4 illustrating practice of the inventive method with consecutive deshirring and stuffing of a food casing with food emulsion.

Referring now to FIGS. 4 and 6, the chuck 38 has a plurality of seats 62 cut radially through the chuck body 40 to the bore 42. The seats 62 are distributed along the chuck between intermediate location 45 and discharge end 46. Disposed in each seat and journaled to the chuck body 40 is a torque transmitting antifriction roller 60. The axis of rotation R of each roller lies in a plane substantially perpendicular to chuck central axis X—X. Rollers 60, as journaled to the chuck body 40, each have a portion extending into the bore 42 along and about the casing deforming zone 50 of the chuck bore. The rollers 60 are aligned in at least three, and preferably four, longitudinal rows L1, L2, L3 and L4 spaced circumferentially about the perimeter of the casing deforming section 50 of the bore 42. There are at least two, and preferably three, rollers 60 in each row as shown in FIGS. 3, 4 and 8. Preferably, the rollers 60 in one row align transversely with the rollers in adjacent rows so that the axes of rotation R lie in transverse planes p1, p2 and p3 (see FIG. 4).

Figure 7:
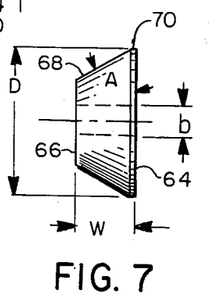
FIG. 7 is an enlarged end view of a circular roller member suitable for use in the casing deforming section of the chuck member.

As shown in FIGS. 6 and 7, and most clearly in FIG. 7, each of the rollers has an end face 64 which leads in the direction chuck rotation and an end face 66 which trails in the direction of chuck rotation and an outer peripheral surface 68. The intersection of roller outer surface 68 with roller leading face 64 defines a leading edge 70. This edge deforms and bites into the food filled casing passing through the casing deforming section 50 of the bore to transmit the rotation of the chuck (in the direction of arrow 59) to the food-filled casing.

If the roller is relatively thin (e.g., disc-shaped) the included angle "A" between the roller outer surface 68 and leading face 64 can be up to 90°. If the roller is thicker, as shown in FIG. 7, it is preferred that it be the shape of a truncated right circular cone wherein the included angle "A" is $$\cong \mathrm{Tan}\, \frac{2W}{D-b}$$

where
D=diameter of leading face 64
b=diameter of the roller bore
W=roller width Angle A provides an edge 70 which bites into the casing for efficient torque transmission to the food-filled casing. The roller trailing face 66 does not necessarily contact the casing surface (FIG. 6). However, the diameter of the rollers trailing end face 66 should not exceed the diameter of the leading and face 64 because this will make the included angle A greater than 90° and reduce the torque transmitting capabilities of the roller in the direction of chuck rotation (indicated by arrow 59).

As shown in FIG. 6, each roller has its leading face 64 oriented in a radial plane so that it extends perpendicular to the periphery of bore 42. Also, in a preferred arrangement, the leading side faces 64 of the rollers should align with a flute sidewall 54 which leads in the direction of chuck rotation.

Referring to FIGS. 1 and 8, the method of this invention may be practiced by retracting the stuffing horn 18, placing a shirred the casing stick 20 on the horn and tben moving the horn forwardly or to the right as viewed in the figures until the horn discharge end 21 is longitudinally positioned within the casing engaging section 48 adjacent to intermediate location 45.

In the casing deshirring and stuffing method, driven member 30 in the chuck housing and chuck 38 are rotated around the longitudinal axis X—X.

The follower 19 pushes the casing stick along the horn and forces the front end of the stick into the casing engaging section 48 of the chuck bore. In this section the flutes 52 grip against the stick and transmit sufficient torgue to spin the stick about the horn. A food emulsion 72 (FIG. 8) is pumped through stuffing horn 18 and into the casing which surrounds the horn discharge end 21. The force of emulsion entering the casing deshirrs, fills and presses casing 74 forwardly from stick 20 and through intermediate location 45 into the casing deforming section 50. In the deforming section 50, the rollers 60 press inwardly on the filled casing (FIGS. 6 and 8) at spaced locations longitudinally along the filled casing. The rollers are driven about their axes of rotation R by the filled casing moving through the casing deforming section. Consequently, the food-filled casing is diametrically restricted by the smaller diameter of bore section 50 and in this section it is further pressed inwardly and is rotatably deformed at a plurality of spaced locations 76 around the longitudinal axis X—X in sub-zones defined in the bore generally by planes p1, p2 and p3. In these spaced sub-zones 76, the food filled casing 74 is pressed inwardly by rollers 60 and then expands to the full restricted diameter of the casing deforming zone 50 before being pressed inwardly by the next downstream set of rollers. As the rollers 60 press inwardly on the filled casing, they grip the filled casing so that rotation of the chuck is transmitted to the filled casing. With the arrangement as shown, the preferred three sets of rollers in four longitudinal rows provide twelve areas of torque transmitting contact over the length of the chuck.

EXAMPLE 1

A series of tests were performed with a food encasing machine of the FIGS. 1–2 type (Model RT-7 manufactured by Townsend Engineering Company). Using three different types of rotatable chuck members on this machine, the same frankfurter emulsion was stuffed into nonreinforced shirred cellulosic casing size 24 (dry flat width about 1.24 inches) manufactured by Viskase Corporation. The casing was either impregnated with wood-derived tar-depleted liquid smoke or contained no liquid smoke (hereinafter "clear casing"). The clear casing had a dynamic COF of 0.32 and the smoke impregnated casing had a dynamic COF of 0.46.

Chuck A was a plastic type in commercial use and sold by Townsend Engineering Company for stuffing size 24 nonreinforced casing. This commercial chuck is similar to the chuck shown in U.S. Pat. No. 3,191,222. The chuck has eight flutes uniformly circumferentially spaced around the periphery of the chuck bore and extending the entire length of the bore. The chuck had an overall length of 2.56 inches, comprising a 0.44 inch long inwardly tapered casing engaging inlet section and a 2.12 inch long casing deforming section. The inlet diameter was 1.125 inches and the diameter of the casing deforming section of the bore was 0.656 inch. The flutes in the casing engaging section gradually increased in width and height from the inlet end toward the deforming section so as to blend with the geometry of the flutes in the deforming section. Each flute at full size had a perpendicular first sidewall height of 0.093 inch and the included angle of the intersecting second sidewall was 45 degrees with a 0.093 inch wide base section. Chuck A had no rollers in the casing deforming section.

Chuck B was identical to chuck A except that alternate flutes were removed so that only four flutes were equally spaced around the periphery of the chuck bore from the inlet end to the discharge end. During stuffing with chucks A and 8 the horn discharge end 21 was positioned so as to be aligned with the end of the casing engaging section 48 adjacent of the intermediate location 45.

Chuck C was identical to chuck B except that the flutes were eliminated from the entire casing engaging section, and also from the casing deforming section except for the portion 0.75 inch from the discharge end. Except for the latter portion, chuck C had a smooth uninterrupted bore surface. During stuffing with chuck C, the horn discharge end was positioned 1.25 inches closer to the chuck discharge end than with chucks A and B.

Chuck D had the same flute confiquration in the casing engaging section as chuck A, and a smooth bore of 0.850 inch diameter in the casing deforming section (no flutes). Chuck D was also provided with a plurality of spaced circular rollers in the casing deforming section as illustrated in FIGS. 3, 4, 6 and 8. That is, the rollers were aligned in three uniformly spaced transverse planes and four uniformly spaced longitudinal rows, i.e.. a total of twelve rollers. The rollers made of nylon were each 0.121 inch wide with a leading end face diameter of about 0.307 inch, a trailing end face diameter of about 0.180 inch, the edge 70 was about 0.010–0.015 inch wide, and the included angle "A" was about 60°. The rollers were mounted in the chuck bore wall so that the edge 70 of each roller extended about 0.093 inches into from the bore wall into the hollow bore.

The food stuffing machine was operated at typical commercial production rates of between about 490 and 525 RPM. Frankfurter link lengths were measured and the nature of any breakage was observed. The stuffed diameter for all products was about 22.0 mm. The results of these tests are summarized in Table A.

TABLE A

| | Link Length Evaluation | | | |
|---|---|---|---|---|
| Casing Sample (Outer Surface) | Chuck | Chuck RPM | No. Of Breaks | Link Lengths* Average (in) |
| 1. Clear | A | 490 | 0 | 5.07 |
| 2. Smoke Coating | A | 512 | 14 | 4.81 |
| 3. Smoke Coatlng | B | 525 | 1 | 4.87 |
| 4. Smoke Coating | C | 500 | 0 | 4.88 |
| 5. Smoke Coating | D | 512 | 1 | 5.10 |

*Average of 10 links per stick. Three sticks were evaluated for each treatment

Table A demonstrates by comparison of casing Samples 1 and 2 that the frankfurter link length is reduced when stuffing a smoke impregnated cellulosic casing using a conventional chuck (chuck A) with eight end-to-end flutes. Reducing the number of flutes from eight to four (chuck B) restored some length (casing Sample 3 vs. 1). Eliminating a portion of the flutes in the casing deforming section (chuck C) had about the same effect (casing Sample 4 vs. 1). However, use of chuck D having a plurality of rollers positioned in multiple transverse planes and longitudinal rows (in accordance with this invention) resulted in increasing the link length (casing Sample 5 vs. 1) without significantly increasing the breakage frequency.

EXAMPLE 2

Another series of tests were performed to compare the stuffing performance of the aforedescribed inventive chuck D and a prior art roller chuck of the type disclosed in U.S. Pat. No. 4,670,942. This chuck, identified as chuck E, has four rollers on the chuck body which are disposed about the discharge end of the chuck so that the roller surfaces together form a conduit. All rollers simultaneously contact and deform the meat-filled casing at the chuck discharge end. In these tests, the same type and size casing was used as in Example 1. Also, the same roller chuck embodiment of this invention (chuck D) was used along with the standard flute-type chuck A having eight end-to-end flutes. The food encasing machine was the same Townsend RT-7 used in Example 1. The machine (linker) speed and link weight was initially determined by stuffing the clear (uncoated) nonreinforced cellulosic casing to the upper end of its recommended stuffing diameter (22.0 mm) with the standard eight flute chuck A. No further machine adjustments were made as casings and chucks were changed during the tests.

The results of these tests are summarized in Table B.

TABLE B
Roller Chuck Evaluation

| Casing Sample (Outer Surface) | Chuck | Stuffed Dia. Avg. (mm) | S.D. (mm) | Link Length Avg. (in) | S.D. (in) | No.* |
|---|---|---|---|---|---|---|
| 5. Clear | A | 22.01 | .05 | 5.14 | .02 | 40 |
| Clear | D | 21.95 | .13 | 5.19 | .03 | 20 |
| Clear | E | 21.68 | .14 | 5.20 | .01 | 20 |
| 6. Smoke Coating | A | 23.0 | .11 | 4.76 | .05 | 20 |
| Smoke Coating | D | 22.05 | .10 | 5.08 | .04 | 20 |
| Smoke Coating | E | 22.07 | .11 | 5.06 | .03 | 20 |

*Number of links
S.D. = Standard Deviation

Table B confirms the Table A demonstration that the conventional flute-only chuck (chuck A) has the highest drag or holdback as evidenced by the largest average stuff diameter and shortest link length for each type of casing. Use of either the prior art discharge end-only roller chuck E or the inventive roller chuck D to stuff liguid smoke-impregnated casing, provided a stuffed diameter very close to the recommended stuff diameter (22 mm). Also, when stuffing the smoke impregnated casing, there was only a very small link length reduction with the chucks D and E compared to the clear casing. These tests demonstrate that for this particular combination of chuck size and casing diameter, the longitudinally spaced roller chuck of this invention is (chuck D) functionally equivalent to the prior art discharge end roller chuck assembly (chuck E).

EXAMPLE 3

In still another series of tests the aforedescribed Viskase size 24 cellulosic casing was subjected to different inflation pressures to simulate different internal stuffing pressures. The inflated casing was then used to compare the force (torque) required to rotate three different types of chucks (A, D and E) around the outer surface of the casings. In one set of tests the casing was clear, and in another set of tests the outer surface of the same type of casing was impregnated with tar-depleted liquid smoke. In all tests the chuck was rotated in the normal direction for stuffing casing i.e., clockwise when facing the chuck inlet end (FIG. 5). The torque required to cause the chuck to slip about the inflated casing was measured at each inflation pressure. The data from these tests is summarised in Table C, wih torque values in lb.-inches. For purposes of this test, torque values with ±½ lb-inch are considered to be the same values.

TABLE C
Torque Comparisons

| Chuck | Inflation Pressure (psi) Torque (lb-inches) | | | | | |
|---|---|---|---|---|---|---|
| | 3 | 4 | 5 | 6 | 7 | 8 |
| Clear Casing | | | | | | |
| A | 2.34 | 2.83 | 3.07 | 3.69 | 4.43 | 5.17 |
| D | 0.99 | 1.23 | 1.60 | 2.16 | 2.71 | 3.63 |
| E | 1.48 | 1.72 | 1.97 | 2.22 | 2.40 | 2.71 |
| Smoke-Impregnated Casing | | | | | | |
| A | 2.34 | 3.02 | 3.69 | 4.19 | 4.80 | 5.17 |
| D | 1.72 | 2.40 | 3.08 | 3.63 | 4.31 | 5.36 |
| E | 1.72 | 1.97 | 2.34 | 2.71 | 2.96 | 3.69 |

This data shows that chuck D of the present invention is capable of transmitting about the same level of torque to smoke-impregnated casing as the standard fluted chuck A transmits to clear casing which has a lower dynamic COF. Also, chuck D at higher stuffing pressures is capable of transmitting more torque to smoke impregnated casing than the prior art roller chuck E.

EXAMPLE 4

A further series of tests was conducted to compare the longitudinal forces required to move clear and liquid-smoke coated casing through the three different types of chucks (A, D and E). In this test, the same Viskase size 24 cellulosic casing inflated to different pressures, was manually pulled through the chucks. In one set of tests the casing outer surface was clear, and in another set of tests the outer surface of the same type of casing was impregnated with tar-depleted liquid smoke. The drag force or "holdback" was measured in pounds, and the data are summarized in Table D. Drag forces within ±¼ pound are considered for purposes of this test to be substantially the same.

TABLE D
Drag Force Comparisons

| Chuck | Inflation Pressure (psi) Drag (lbs.) | | | | | |
|---|---|---|---|---|---|---|
| | 3 | 4 | 5 | 6 | 7 | 8 |
| Clear Casing | | | | | | |
| A | 3.50 | 4.25 | 5.5 | 6.0 | 6.75 | 7.90 |
| D | 1.15 | 1.40 | 1.70 | 2.0 | 2.25 | 2.55 |
| E | 2.15 | 2.40 | 2.75 | 3.25 | 3.85 | 4.50 |
| Smoke-Impregnated Casing | | | | | | |
| A | 4.10 | 5.30 | 6.60 | 7.95 | 8.50 | 8.70 |
| D | 1.45 | 1.65 | 2.05 | 2.60 | 3.10 | 3.70 |
| E | 2.30 | 2.95 | 3.40 | 4.20 | 4.90 | 5.70 |

This data shows that chuck D of the present invention imparts substantially less drag force on both clear and smoke-impregnated casing than either of the prior art chucks A or E. Less drag, particularly on the smoke-impregnated casing having a higher dynamic COF, translates to a more acceptable link length as compared to use of either chuck A or E.

The data from Examples 3 and 4 shows that, as compared to conventional chucks A and E, the chuck of the present invention has the same or higher torque transmitting capacity as other chucks tested while imparting less longitudinal drag on the casing than the other chucks. This is particularly significant when stuffing with a liquid-smoke impregnated casing which has a high dynamic COF where the increase in drag as the casing passes through the chuck is likely to produce unacceptably short links.

What is claimed is:

1. A rotatably drivable chuck member for a stuffing machine comprising:
   (a) a rotatably drivable body having an axial cylindrical bore to accommodate the passage through said body of a casing being stuffed, said bore defining a longitudinal axis about which said body is rotatable and having
      (i) an inlet and an outlet
      (ii) a casing engaging inlet section which tapers inwardly from a large diameter at said inlet to a smaller diameter at a location intermediate said inlet and outlet and
      (iii) a casing deforming section extending from said intermediate location to said outlet;
   (b) a multiplicity of longitudinally extending casing engaging flutes in said inlet section circumferentially spaced about the periphery of said inlet section, each of said flutes having first and second sidewalls extending from said periphery towards said axis wherein said first wall is normal to said periphery and said second wall is inclined towards and intersects said first wall at an apex which forms a casing engaging edge, and said first wall of each flute facing in the direction of rotation of said body;
   (c) a plurality of rollers journaled to said rotatably drivable body between said intermediate location and said outlet for rotation about a roller axis which lies in a plane substantially transverse to said longitudinal axis, said rollers each having a portion extending into said casing deforming section to rotatably engage and deform a food-filled casing passing through said bore;
   (d) said plurality of rollers being aligned in at least three longitudinally extending rows circumferentially spaced about the perimeter of said casing deforming section and each of said rows containing at least two longitudinally spaced rollers; and
   (e) each of said rollers having a first side which faces in the direction in which said body rotates about said longitudinal axis for deforming contact with said food-filled casing.

2. A chuck member according to claim 1 wherein each of said rollers has a side face which faces in the direction opposite to the direction in which said body rotates about said longitudinal axis and the diameter of said second side face not exceeding the diameter of said first side face.

3. A chuck member according to claim 1 wherein each of said rollers has an outer peripheral surface extending between and intersecting said sides and the included angle between said first side and said peripheral surface is not greater than 90°.

4. A chuck member according to claim 3 wherein said included angle is between about 45°–90°.

5. A chuck member according to claim 1 wherein said leading face of each roller is longitudinally aligned with said first sidewall of a said flute.

6. A chuck member according to claim 1 wherein said rollers disposed in one of said longitudinal rows are transversely aligned with the rollers in an adjacent longitudinal row.

7. A chuck member according to claim 6 wherein there are three of said rollers in each of said longitudinal rows.

8. A chuck member according to claim 1 wherein said rollers are aligned in four circumferentially spaced longitudinal rows.

9. A chuck member according to claim 1 wherein said plurality of rollers are arranged in four spaced longitudinal rows with the axes of rotation of said rollers being disposed in three transverse planes.

10. A chuck member according to claim 1 wherein said casing deforming section has a smooth uninterrupted surface between said rollers.

11. A chuck member according to claim 1 wherein said body has a plurality of seats extending radially through to the casing deforming section of said bore, said seats being arranged in at least three longitudinal rows with at least two seats in each of said rows, and said rollers being journaled to said body within said seats such that a portion of the rollers outer peripheral surface rotates into said casing deforming section.

12. A chuck member according to claim 1 wherein said intermediate location is up to about 30% of the length of said cylindrical bore from said inlet.

13. A chuck member as in claim 1 wherein said first side of said rollers extends perpendicular to the periphery of said cylinderical bore.

14. In a method for consecutively deshirring a shirred food casing and stuffing it with food emulsion while rotating the deshirring casing around a longitudinal axis and longitudinally moving the casing first through a progressively smaller diameter casing engaging zone while stuffing it with food emulsion and thereafter diametrically restricting the food emulsion-filled casing while moving it through a casing deforming zone wherein the improvement comprises the steps of gripping and driving the food emulsion-filled casing about its longitudinal axis by pressing rotatably against and inwardly deforming the food emulsion-filled casing at a plurality of circumferentially spaced locations around said longitudinal axis in each of a multiplicity of longitudinally spaced sub-zones in said casing deforming zone.

15. A method according to claim 14 wherein said pressing rotatably against and inwardly deforming occurs in at least three circumferentially spaced locations in each of said sub-zones.

16. A method according to claim 14 wherein said pressing rotatably against and inwardly deforming occurs in at least three longitudinally spaced sub-zones.

17. A method according to claim 14 wherein said pressing rotatably against and inwardly deforming occurs in four circumferentially spaced locations in each of said sub-zones.

18. A method according to claim 14 wherein said pressing rotatably against and inwardly deforming occurs in four circumferentially spaced locations around said longitudinal axis in each of three longitudinally spaced sub-zones.

19. A method according to claim 14 wherein said shirred food casing is a nonreinforced cellulosic casing.

20. A method according to claim 19 wherein said nonreinforced cellulosic casing has an outer surface impregnated with a coating which imparts a dynamic coefficient of friction to said surface of at least about 0.46.

21. A method according to claim 20 wherein the coating is wood-derived liquid smoke.

UNITED STATES PATENT AND TRADEMARK OFFICE
CERTIFICATE OF CORRECTION

PATENT NO. : 4,812,322

DATED : March 14, 1989

INVENTOR(S) : James F. Bielanski/Keith A. Watts

It is certified that error appears in the above-identified patent and that said Letters Patent is hereby corrected as shown below:

In col. 3, line 38, change "aliqned" to -- aligned --.

In col. 4, line 19, change "impreqnated" to -- impregnated --.

In col. 4, line 17, change "stuffinq" to -- stuffing --.

In col. 4, line 17, change "casinq" to -- casing --.

In col. 5, line 22, change "discharqe" to -- discharge --.

In col. 5, line 60, change "casting" to -- casing --.

In col. 6, line 60, change "tben" to -- then --.

In col. 7, line 3, change "torgue" to -- torque --.

In col. 8, line 1, change "8" to -- B --.

In col. 8, line 14, change "confiquration" to -- configuration --.

UNITED STATES PATENT AND TRADEMARK OFFICE
CERTIFICATE OF CORRECTION

PATENT NO.  : 4,812,322

DATED       : March 14, 1989

INVENTOR(S) : James F. Bielanski/Keith A. Watts

It is certified that error appears in the above-identified patent and that said Letters Patent is hereby corrected as shown below:

In col. 9, line 66, change "summarised" to -- summarized --.

In col. 10, line 33, change "Tbe" to -- The --.

Signed and Sealed this

Twentieth Day of March, 1990

Attest:

*Attesting Officer*

JEFFREY M. SAMUELS

*Acting Commissioner of Patents and Trademarks*